United States Patent [19]

Yamashita et al.

[11] 4,139,274
[45] * Feb. 13, 1979

[54] APPARATUS FOR CHANGING COLOR

[75] Inventors: Akio Yamashita, Kawanishi; Masaaki Hayami, Okayama, both of Japan

[73] Assignee: Matsushita Electric Industrial Co., Ltd., Kadoma, Japan

[ * ] Notice: The portion of the term of this patent subsequent to Jan. 18, 1994, has been disclaimed.

[21] Appl. No.: 734,627

[22] Filed: Nov. 8, 1976

Related U.S. Application Data

[63] Continuation-in-part of Ser. No. 613,954, Sep. 16, 1975, abandoned.

[30] Foreign Application Priority Data

Sep. 18, 1974 [JP] Japan .................................. 49-108250

[51] Int. Cl.² .......................... G02F 1/17; G02F 1/23
[52] U.S. Cl. ..................................... 350/357; 252/408; 350/353; 350/354; 350/356
[58] Field of Search ............... 252/408 R; 350/160 R, 350/160 LC, 160 P, 357, 350, 349, 353, 354, 356; 260/240 D; 96/1 R, 90 PC, 1.5, 1.6

[56] References Cited

U.S. PATENT DOCUMENTS

| | | | |
|---|---|---|---|
| 3,317,266 | 5/1967 | Heller et al. | 350/160 R |
| 3,796,569 | 3/1974 | Kondo et al. | 96/1.6 |
| 3,850,949 | 11/1974 | Ono et al. | 260/307 F |
| 3,930,851 | 1/1976 | Ono et al. | 96/1.5 |
| 3,963,314 | 6/1976 | Yamashita | 350/160 R |
| 3,975,379 | 8/1976 | Schmitt | 260/240 E |
| 4,003,633 | 1/1977 | Yamashita | 350/160 LC |

OTHER PUBLICATIONS

Zaitseva, E. L., Chemischer Informationsdienst, Ausgabe B, Organische Chemie, Report No. 5-262, pp. 99-100 (1974).

Primary Examiner—Benjamin R. Padgett
Assistant Examiner—T. S. Gron
Attorney, Agent, or Firm—Cushman, Darby & Cushman

[57] ABSTRACT

This invention relates to an apparatus for changing color utilizing new materials, the color of which changes, disappears or appears at the stimulation by, for example, light, heat, ions, electricity, pressure or radioactive rays. The materials are new styryl-like compounds having the below mentioned chemical formula:

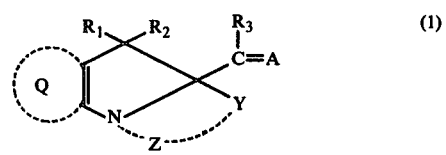

Wherein Q represents a benzene ring with or without substituted radicals and/or condensed ring(s); $R_1$ and $R_2$ represent lower alkyl radicals, hydroxyalkyl radicals or alkoxyalkyl radicals of the same or different kinds,; $R_3$ represents hydrogen, an alkyl radical, alkoxy radical, halogen, nitrile radical, aromatic radical or phenoxy radical; Y represents oxygen (O) or sulphur (S); Z represents an alkylene radical of 2 to 4 carbon atoms with or without alkyl substitution radical(s) necessary to form a ring structure together with

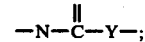

A represents a condensation reaction residue of an aromatic aldehyde, heterocyclic aldehyde, aromatic nitroso compound, or heterocyclic nitroso compound.

3 Claims, 1 Drawing Figure

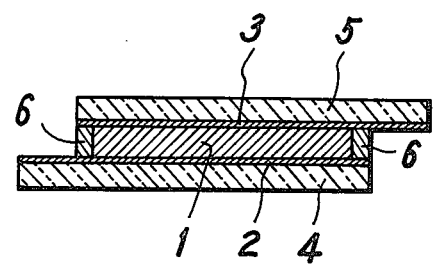

APPARATUS FOR CHANGING COLOR

This application is a continuation-in-part of application Ser. No. 613,954 filed Sept. 16, 1975 and now abandoned.

BACKGROUND OF THE INVENTION

Spiropyran compounds have been well known as substances which changes, lose or restore their colors. However, the abovementioned known substances have shortcomings such as necessitating a great amount of energy and not being sufficiently stable.

SUMMARY OF THE INVENTION

This invention purports to provide novel color-changing compounds which are stable and require less energy to change, lose or restore their colors.

BRIEF DESCRIPTION OF THE DRAWING

The attached FIGURE is a sectional view of a plate-like cell which contains a solution of the compound of the present invention, in which cell the solution changes its color by electric stimulation.

DETAILED DESCRIPTION

The color changing substances of the present invention are compounds of the below mentioned chemical formula:

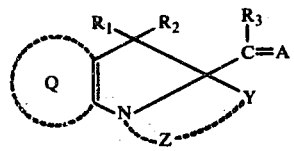
(1)

Wherein and hereinafter in this invention, Q represents benzene ring with or without substituted radical(s) and/or condensed ring(s); $R_1$ and $R_2$ represent lower alkyl radicals, hydroxyalkyl radicals, or alkoxyalkyl radicals of the same or different kinds,; $R_3$ represents hydrogen, an alkyl radical, alkoxy radical, halogen, nitrile radical, aromatic radical or phenoxy radical; Y represents oxygen (O) or sulfur (S); Z represents an alkylene radical of 2 to 4 carbon atoms with or without alkyl substitution radical(s) necessary to form a ring structure together with

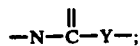

A represents a condensation reaction residue of an aromatic aldehyde, heterocyclic aldehyde, aromatic nitroso compound, or heterocyclic nitroso compound.

A first method of preparing the abovementioned compounds is characterized in that an indoline derivative having the following chemical formula:

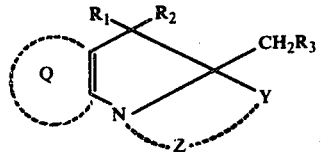
(3)

is reacted with a substance selected from the group consisting of aromatic aldehydes, heterocyclic aldehydes, aromatic nitroso compounds and heterocyclic nitroso compounds, to form styryl-like compounds represented by the following chemical formula:

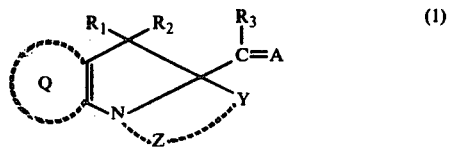
(1)

A second method of preparing the abovementioned compounds is characterized in that a styryl dye having the following chemical formula:

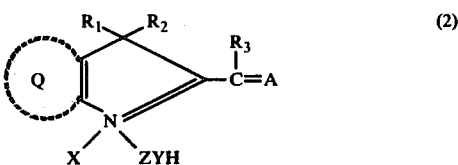
(2)

is reacted with an alkali to form the styryl-like compound represented by the chemical formula (1), wherein X represents an anion.

This invention was made through the finding that a 2nd-position methyl radical or methylene radical of an indoline derivative represented by the chemical formula (3) is chemically active and makes a dehydrating condensation reaction with a aromatic aldehyde, heterocyclic aldehyde, aromatic nitroso compound or heterocyclic nitroso compound to form a condensation product indicated by the chemical formula (1).

The abovementioned reaction is obtainable by either of the following methods:

(1) The abovementioned starting materials (namely, compound of the chemical formula (3) and an aldehyde or a nitroso compound) are heated to a melt in the presence or absence of an alkali.

(2) The abovementioned starting materials are heated to react in a nonpolar solvent.

(3) The abovementioned starting materials are heated to react in an aprotonic type polar solvent.

(4) The abovementioned starting materials are reacted in the presence of an alkali in a protonic type solvent.

(5) The abovementioned starting materials are reacted in the presence of an alkali, in a nonpolar solvent, an aprotonic type polar solvent or a mixture thereof.

(6) The abovementioned starting materials are reacted in a protonic type solvent.

Also, the invention was made through another finding that the abovementioned chemical compounds of formula (1) can be prepared also by treating the styryl compound of formula (2) with an alkali.

When the abovementioned starting materials (i.e., the compound of formula (3) and the aldehyde or nitroso compound) are treated in the absence of alkali, in a protonic type solvent, or in a mixed solvent consisting of a protonic type solvent and at least one solvent selected from the group of nonpolar solvents and aprotonic type polar solvents, then the following two cases occur:

(a) Intended compound represented by formula (1) is produced, and (b) A mixture of the intended compound represented by formula (1) and a by-product (dye) represented by formula (2) is produced. From the mixture, the respective compounds represented by the formulas (1) and (2) can be easily separated from each other by treating the mixture with a fractionating solvent such as ether, benzene, ethyl acetate, n-hexane or cyclohexane.

When the abovementioned indoline-derivative of chemical formula (3) and the abovementioned aldehyde or nitroso compound are made to react with each other in the presence of acetic anhydride, acetic acid or a mixture thereof, then a styryl dye of indolenium type of chemical formula (2) is obtainable. In such reaction by adding an alkali in the mixture of the starting materials or by dissolving the separated coarse product in a suitable solvent and subsequently adding an alkali thereto, and by further heating the mixture, the aimed at product indicated by the formula (1) is prepared.

When the aimed at product of the formula (1) and styryl dyes of indolenium type are produced, in a form of a mixture thereof, by the aforementioned reaction between the indoline-derivative and the abovementioned aldehyde or nitroso compound in the protonic type solvent or a mixed solvent containing such compound in the absence of alkali as abovementioned, then the aimed at product is obtainable by adding an alkali into the abovementioned reacting system or a solution made by dissolving the separated mixture in a suitable solvent and subsequently heating the reacting system or the solution.

For the abovementioned alkali, many organic or inorganic alkalis can be used.

For the organic alkali, triethylamine, piperidine or morpholine is preferable. For the inorganic alkali, alkali carbonate or ammonia is preferable.

One example of preparation of the indoline derivative of formula (3) is as follows:

A 2-alkyl-indolenine derivative represented by the following formula

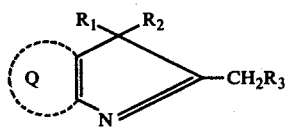

(4)

and a quaternary-salts agent represented by XZYH, as the starting materials, are heat-reacted. The resultant product represented by the following formula (5) is treated in an aqueous solution or an organic solvent solution of inorganic alkali such as caustic soda, sodium carbonate or ammonia, or of organic alkali such as triethylamine, piperidine or morpholine.

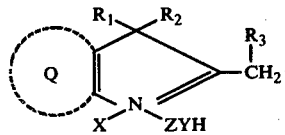

(5)

Then, the separated oil-like substance or crystal is further extracted by means of non-aqueous organic solvent. Then, the product is dehydrated, and the solvent is evaporated, and the residue product is crystallized through vacuum distillation or by means of a nonpolar organic solvent.

Further, through another vacuum distillation and crystallization or precipitation, the indoline derivative represented by formula (3) is obtained.

For the starting materials, namely, the indoline derivative of formula (3) and an aldehyde or a nitroso compound, any indoline derivative, any aldehyde or any nitroso compound can be employed provided that these starting materials enable dehydrating condensation reaction between methyl radical or methylene radical of 2nd-positon of the indoline derivative and aldehyde radical or nitroso radical of the aldehyde or nitroso compound. For instance, for a benzene-ring substitution radical to constitute the indolenine-derivative of formula (4), an alkyl radical, substituted alkyl radical, alkoxy radical, aryloxy radical, amino, substituted amino, aryl, substituted aryl, alkoxy carbonyl radical, carboxy radical, carboxy alkyl radical, nitro radical, ciano radical or halogen can be employed.

On the other hand, the color-type styryl dyes represented by formula (2) are also obtainable by condensation-reaction of the abovementioned product of formula (5) and aromatic aldehydes, heterocyclic aldehydes or nitroso compounds represented by Ar-(CH=CH)$_n$-CHO or Ar-NO (wherein Ar represents a aromatic nucleus or heterocyclic nucleus, n indicates 0 or 1).

As preferable indolenine derivative for the present invention any of the following can be employed: 2,3,3-trimethyl-indolenine, 2,3,3,5-tetramethyl-indolenine, 2,3,3-trimethyl-4-methoxy-indolenine, 2,3,3-trimethyl-5-methoxy-indolenine, 2,3,3-trimethyl-6-methoxy-indolenine, 2,3,3-trimethyl-7-methoxy-indolenine, 2,3,3-trimethyl-5-amino-indolenine, 2,3,3-trimethyl-5-acetoamino-indolenine, 2,3,3-trimethyl-5-benzoylamino-indolenine, 2,3,3-trimethyl-5-dimethylamino-indolenine, 2,3,3-trimethyl-5-ethylamino-indolenine, 2,3,3-trimethyl-5-nitro-indolenine, 2,3,3-trimethyl-6-nitro-indolenine, 2,3,3-trimethyl-5-iodo-indolenine, 2,3,3-trimethyl-7-bromo-indolenine, 2,3,3-trimethyl-5-ethoxycarbonyl-indolenine, 2,3,3-trimethyl-5-phenoxy-indolenine, 2,3,3-trimethyl-5-anilino-indolenine, 2,3,3-trimethyl-5-carboxy-indolenine, 2,3,3-trimethyl-5-cyano-indolenine, 2,3,3-trimethyl-5-phenyl-indolenine, 2,3,3-trimethyl-4,5-benzo-indolenine, 2,3,3-trimethyl-4,5-dimethoxy-indolenine, 2,3,3,5,7-pentamethyl-indolenine, 2,3,3-trimethyl-5,6-dimethoxy-indolenine, 2,3,3,7-tetramethyl-5-nitro-indolenine, 2-methyl-3,3-diethyl-indolenine, 2,3-dimethyl-3-ethyl-indolenine, 2,5-dimethyl-3,3-diethyl-indolenine, 2,3-dimethyl-3-hydroxyethyl-indolenine, 2,3-dimethyl-3-ethoxymethyl-indolenine and 2,3-dimethyl-3-phenoxyethyl-indolenine. Besides, polycyclic condensation indolenine such as naphto-indolenine can be employed, too.

As preferable quaternary salts agent for the present invention, any of the following can be employed: ethylene bromohydrin, ethylene chlorohydrin, trimethylene chlorohydrin, trimethylene bromohydrin, tetramethylene chlorohydrin, tetramethylene bromohydrin, 1-chloro-2-propanol, 2-chloro-1-propanol, 2-chloroethyl mercaptan and 3-chloropropyl mercaptan.

It was empirically found that any of the following aromatic aldehydes can be used as the aforementioned aromatic aldehyde: benzaldehyde, p-acetaminobenzaldehyde, p-bromobenzaldehyde, m-bromobenzaldehyde, o-bromobenzaldehyde, p-dimethylaminobenzaldehyde, p-diethylaminobenzaldehyde, p-dibutylamino-benzaldehyde, o-chlorobenzaldehyde, p-chlorobenzaldehyde, p-anisaldehyde, o-anisaldehyde, p-tolu-aldehyde, m-tolu-aldehyde, o-tolu-aldehyde, o-ethoxybenzaldehyde, p-ethoxybenzaldehyde, p-fluorobenzaldehyde, o-fluorobenzaldehyde, p-nitrobenzaldehyde, m-nitro-benzaldehyde, o-nitrobenzaldehyde, p-cyanobenzaldehyde, o-cyanobenzaldehyde, 2,4-dichlorobenzaldehyde, 2,6-dichlorobenzaldehyde, 2,4-dichlorobenazaldehyde, 3,5-dichlorobenzaldehyde, 2,4-dimethoxybenzaldehyde, 2,5-dimethoxybenzaldehyde, 3,4-dimethoxybenzaldehyde, 3,5-dimethoxybenzaldehyde, 2,4-dimethylbenzaldehyde, 2,5-dimethylbenzaldehyde, 3,4-dimethylbenzaldehyde, 3,5-dimethylbenzaldehyde, veratraldehyde(3,4-dimethoxy benzaldehyde), 4-isopropylbenzaldehyde, o-(2-chloroethyl) benzaldehyde, 2,4,6-trimethylbenzaldehyde, 2,4,6-triethoxybenzaldehyde, 3,4-dimethyl-p-anisaldehyde, 2,5-dimethyl-p-anisaldehyde, 2-chloro-5-nitrobenzaldehyde, 2-chloro-6-nitrobenzaldehyde, 2-chloro-3-nitrobenzaldehyde, 5-chloro-2-nitrobenzaldehyde, vanillin, o-vanillin, isovanillin, 5-bromo-vanillin, 2-chloro-4-dimethylaminobenzaldehyde, 2-chloro-6-fluorobenzaldehyde, 5-bromo-veratraldehyde, 6-bromo-veratraldehyde, 5-bromo-2-methoxy-benzaldehyde, 1-naphto-aldehyde, 2-naphto-aldehyde, p-dimethylamino-cinnamaldehyde, p-diethylamino-cinnamaldehyde, p-nitrocinnamaldehyde, o-nitro-cinnamaldehyde, α-chlorocinnamaldehyde, 2-chloro-cinnamaldehyde, 9-anthraldehyde, 10-chloro-9-anthraldehyde, 9-phenanthrene-carboxaldehyde and fluorencarboxaldehyde.

It was empirically found that any of the following aromatic nitroso compounds can be used as the aforementioned aromatic nitroso compound: p-dimethylaminonitrosobenzene, p-diethylaminonitrosobenzene, p-methyl-nitrosobenzene(p-nitrosotoluene) p-nitro-nitrosobenzene, o-nitro-nitrosobenzene, 3-nitroso-2-nitrotoluene.

It was empirically found that any of the following heterocyclic aldehydes can be used as the aforementioned heterocyclic aldehyde: furfural, 5-methylfurfural, 5-bromofurfural, 4-isopropylfurfural, 2-thiophenecarboxaldehyde, 5-methyl-thiophene-carboxaldehyde, 3-methoxybenzothiocitric-2-carboxaldehyde, 2-pyridinecarboxaldehyde, 3-pyridinecarboxaldehyde, 4-pyridinecarboxaldehyde, 1-ethylindole-3-carboxaldehyde, 1-methylindole-3-carboxaldehyde, 1-methyl-2-phenylindole-3-carboxaldehyde, N-methyl-carbazole-2-carboxaldehyde, N-ethyl-7-bromo-carbazole-2-carboxaldehyde, N-(n-octyl)-7-nitro-carbazole-2-carboxaldehyde, benzofuran-2-carboxaldehyde, dibenzofuran-2-carboxaldehyde, pyrrole-2-aldehyde, N-methylpyrrole-2-aldehyde, N-phenylpyrrole-2-aldehyde, 3-methylpyrrole-2-aldehyde, 2-ethyl-pyrrole-5-aldehyde, benzothiazole-2-aldehyde, 6-methylbenzothiazole-2-aldehyde, 6-chlorobenzothiazole-2-aldehyde, 5-chlorobenzothiazole-2-aldehyde, 6-methoxybenzothiazole-2-aldehyde, 5,6-dichlorobenzothiazole-2-aldehyde, benzoselenazole-2-aldehyde, 6-methoxybenzoselenazole-2-aldehyde, 4-methylthiazole-2-aldehyde, 3,3-dimethyl-indolenine-2-aldehyde, 2,4-dimethylpyrrole-2-aldehyde, 4,6-dichloro-pyrimidine-5-carboxaldehyde, 2-formyl-4,6-dimethylpyrimidine, quinoline-2-aldehyde, acridine-10-aldehyde, 2,4-diphenyl-5,6,7-hexahydrobenzopyran-8-carboxaldehyde and 2,4-diphenyl-6-methyl-5,6,7-pentahydrobenzopyran-8-carboxaldehyde, N-ethyl-benzothiazole-2-pentamethine-ω-aldehyde, 3-ethyl-2-formylmethylene-2(3H)thiazolyliden, 1,3,3-trimethyl-2-formylmethylene-2(3H)indolylidene, furan-2-dimethine-β-aldehyde.

It was empirically found that any of the following heterocyclic nitroso compounds can be used for the aforementioned heterocyclic nitroso compounds: 3-nitrosoindole, 2-methyl-3-nitrosoindole and 3-nitrosophenylindole.

In each of the styryl-like compounds produced according to the present invention, each closed ring exists only on the side of its indoline ring, and on the right side of the methine-chain of the 2nd-position carbon, the structure is not on the same plane with the left side. Namely, the compounds have structures bent at the methine-chain. Therefore, the localized electrons become abundant in comparison with ordinary indoline dyes wherein the electrons are not localized. Consequently, in the compounds produced by the present invention, maximum absorptions can not reach the wavelengths in visual range, and the maximum absorptions lie in the ultraviolet ray range, showing a white, transparent or pale yellowish appearance. The abovementioned compounds change into a plane structure of the indolenium type of formula (2) when their N-Z-Y rings open.

By selecting the component members, namely indoline derivative and aldehyde or nitroso compound, various dyes having maximum absorptions in near ultraviolet range, visible range or in near infrared range are obtainable. Also, the dyes show various maximum absorptions when dissolved in various solvents as follows:

3,3-dimethyl-2-(p-dimethylaminostyryl)indolino[1,2-b]oxazoline 298 nm (in n-hexane),
547 nm (in methanol),
298 nm (in n-propanol),
298 nm (in n-octyl alcohol),
547 nm (in acetic acid),
299 nm (in acetonitrile-acetic acid),
299 nm (in acetonitrile),
550 nm (in ethanol).

Others of the abovementioned compounds of the present invention show similar characteristics, wherein the compounds show prominent red-shift in methanol, ethanol or acetic acid.

Comparison between the compounds of the present invention and conventional spiropyran compounds, which comparison is used as photographic or thermal recording material, is elucidated in the following, so as to clarify the advantage of the compounds of the present invention.

In the present invention, the closed ring structure is formed by the indoline ring only, while in the conventional indolino-spiropyrans, a closed ring structure exists between the indoline ring and benzem ring. This difference gives the compounds of the present invention a great advantage in that the aldehyde or nitroso compound as starting material can be selected from a wide variety.

In the conventional indolino-spiropyran compounds, it is necessary to select an aromatic aldehyde or a nitroso compound which has a hydroxyl radical in the ortho-position. However, according to the present invention, such condition is not necessary, but any kind as well as any structure of the aromatic aldehyde or nitroso compound can be used, and furthermore, a heterocyclic aldehyde or a heterocyclic nitroso compound also can be used.

Moreover, in the conventional indolino spiropyran compounds, it is necessary that the aldehyde radical or the nitroso radical bonds to the aromatic ring. However, in the present invention such is not required, and the aldehyde radical or nitroso radical need not bond directly to the aromatic ring or the heterocyclic ring, but may bond at the end of a conjugate diene bond.

The abovementioned characteristic of the present invention causes advantages in selection of materials, variety of colors of the produced dye, and other physical properties. For instance, the conventional indolino spiropyran compounds have a structure such that the indoline ring and the benzem ring are connected by two methine chains, and therefore, when the structure is changed to open and show visible color, the number of conjugate double-bond chains is limited, and consequently, the wavelength of maximum absorption of the compound is limited at most in the region of 550–580 nm even if a substitution radical is suitably selected. In other spiropyrans, there are such shortcomings as the purity of color at the open-ring structure is not satisfactory, or the changing to the open-ring structure takes place only in cold temperature. Even at a the indolino spiropyrans which have the purest colors, the variety of colors is not satisfactory. On the contrary, the abovementioned compounds of the present invention have many varieties of colors produced by various absorptions near the ultraviolet to near the infrared regions, and has an advantage of showing various colors in response to an additive such as solvent.

Also, the applications in photographic field, the styryl-like compounds of the present invention as well as the indolenium-type open-ring structure compounds of formula (2) are useful as optic sensitizers when used together with various cyanine dyes. The compounds of the present invention can be used as a non-developable masking film of erasable type of a photographic film. When contained in a film emulsion of diffusion-transfer type photographic film, the compounds of the present invention function to increase the transfer sensitivity and keep the film base clean even after repetition of the transfer process.

Characteristics of the styryl-like compounds of the present invention are as follows:

(1) Most of the foregoing compounds have absorption in the ultraviolet region, and have a colorless (transparent) or light yellowish appearance.

(2) When stimulated by light, heat, ions, electricity, pressure or radioactive rays, etc., the compounds are reformed into the belowmentioned open-ring structure of the indolenium type:

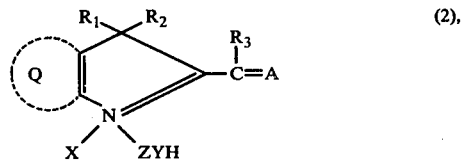

Wherein X represents an anion such as halogen, acid radical or alkoxyanion.

The reformed compounds function as color-forming dyes having absorption in the near-ultraviolet region, visible region and/or near-infrared region.

(3) The dyes of open-ring structure of the indolenium type again return to the indoline type closed-ring structure by reverse stimulation or elimination of the abovementioned stimulations.

(4) The abovementioned color-change and/or color-disappearance-and-reappearance are reversible, and these reversible changes can be repeated many times, and the reappearing color is stable. The reversibility depends upon the strength of the chemical coupling, and the stronger the coupling is, the poorer the reversibility becomes. By selecting suitable component materials, various degrees of the chemical coupling are obtainable.

(5) The color-restoring structure of the dye, hence the color obtained, can be fixed by selecting the solvent, additive or temperature.

In the following, various examples of compounds of the present invention and their light-absorption wavelengths characteristics are shown:

EXAMPLE 1

3,3-dimethyl-2-(para-dimethylaminostyryl)indolino[1,2-b]oxazoline

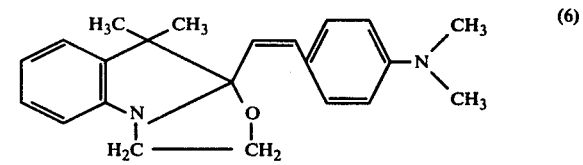

maximum absorption wavelength
at closed ring structure — 296 nm
at open ring structure — 547 nm This compound was prepared in the following way:

Thirty gram of 2,3,3-trimethyl indolenine and 25 g of ethylene bromhydrin were heated at 120° C. for 6 hrs. The resultant viscous solid was refluxed with heating in 100 ml of acetone. The resultant residue was cooled and filtered to form 38 g of 1-hydroxyethyl-2,3,3-trimethyl indoleniumbromide. Next, 10 g of 1-hydroxyethyl-2,3,3-trimethyl indoleniumbromide was mixed with sodium carbonate solution. The mixture was extracted with ethylether. The ethylether-region was separated and washed with water, and then dehydrated with anhydrous magnesium sulfate and filtered. The filtrate was evaporated to remove the ethyl ether, with formation of a pale yellow oily substance. By distillating the pale yellow oily substance under reduced pressure, 2,3,3-trimethyl indolino[1,2-b]oxazoline represented by general formula (3) was obtainable as a colorless oily substance having boiling point of 112° C./6 mmHg.

It was confirmed by means of elemental analysis and nuclear magnetic resonance spectra, data of which are shown below:

By elemental analysis, Molecular formula was: $C_{13}H_{17}NO$, C: 77.22 (theoretical value 76.85) H: 8.54 (theoretical value 8.37) N: 7.03 (theoretical value 6.90).

By nuclear magnetic resonance spectra (Solvent: $CDCl_3$, Reference Sample: Trimethylsilane), $\delta = 1.15$ (3H.S. 3—$CH_3$ or 2—$CH_3$),
$\delta = 1.31$ (3H.S. 3—$CH_3$ or 2—$CH_3$),
$\delta = 1.40$ (3H.S. 3—$CH_3$ or 2—$CH_3$),
$\delta = 3.34$–3.89 (4H.m. —$CH_2$—$CH_2$—),
$\delta = 6.66$ and 7.00–7.20 (3H.m. Aromatic protons),
hence, Structural formula:

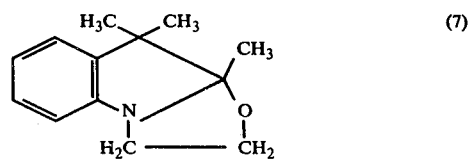

One gram of 2,3,3-trimethyl indolino[1,2-b]oxazoline and 0.75 g of para-dimethylaminobenzaldehyde were refluxed in 30 ml of absolute ethanol for 3.0 hours, and then the solvent was removed by evaporation. The residue was extracted with ethyl ether. The layer of ethyl ether (ethyl ether containing the extract) was dried with neutral drying agent such as magnesium sulfate and filterd out. The filtrate was evaporated to remove the solvent. The resultant residue was extracted by heating in n-hexane. The mixture was treated with active carbon and filtered. The filtrate was evaporated to take away the solvent. The resultant residue was treated with petroleum ether to obtain 0.35 g of the desired product, namely a very pale yellowish cream amorphous crystal, which melts at 142° C. and exhibits its maximum absorption (in n-hexane) at 296 nm.

EXAMPLE 2

3,3-dimethyl-5-methoxy-2-(para-dimethylaminostyryl)indolino[1,2-b]oxazoline

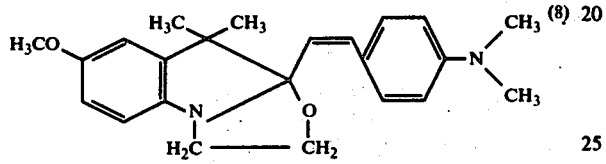

maximum absorption wavelength
at closed ring structure — 297 nm
at open ring structure — 542 nm

EXAMPLE 3

3,3-dimethyl-5-nitro-2-(para-dimethylaminostyryl)-indolino[1,2-b]oxazoline

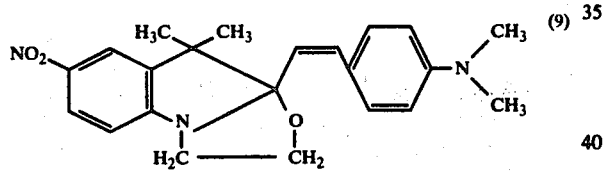

maximum absorption wavelength
at closed ring structure — 303 nm
at open ring structure — 580 nm

EXAMPLE 4

3,3,5-trimethyl-2-(para-dimethylaminostyryl)indolino[1,2-b]oxazoline

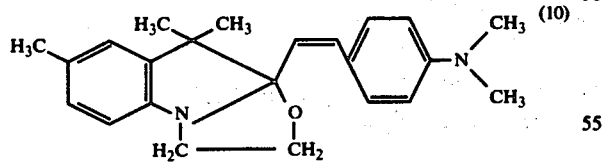

maximum absorption wavelength
at closed ring structure — 297 nm
at open ring structure — 547 nm This compound was prepared in the following way:
In 30 ml of acetonitrile, 1.1 g of 2,3,3,5-tetramethylindolino[1,2-b]oxazoline and 0.75 g of para-dimethylaminobenzaldehyde were heated on a water bath for 2 hours, and then the acetonitrile was removed by evaporation under vacuum. The resultant residue was dissolved in 30 ml of acetone. The solution was treated with active carbon and filtered. The filtrate was evaporated to remove the acetone. The residue was further dissolved in ethyl ether. The solution was treated with active carbon and filtered. The ethyl ether was removed from the filtrate by evaporation. The resulting residue was broken by means of petroleum ether. The petroleum ether was filtered off with suction. Upon vacuum-drying the residue, the desired product, namely a pale yellow white powdered crystals, was obtained. The crystals melt at 170° C. and exhibit their maximum absorption (in n-hexane) at 297 nm.

EXAMPLE 5

3,3-dimethyl-2-(para-chlorostyryl)indolino[1,2-b]oxazoline

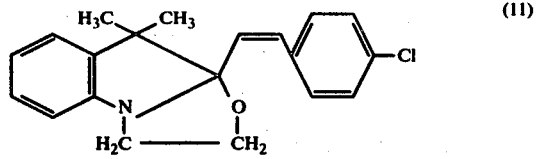

maximum absorption wavelength
at closed ring structure — 259 nm
at open ring structure — 392 nm

EXAMPLE 6

3,3-dimethyl-5-chloro-2-(para-chlorostyryl)indolino[1,2-b]oxazoline

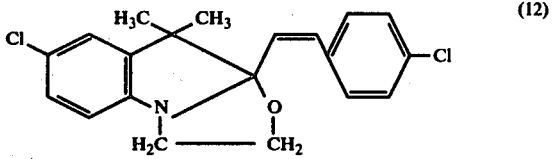

maximum absorption wavelength
at closed ring structure — 255 nm
at open ring structure — 398 nm

EXAMPLE 7

3,3-dimethyl-5-chloro-2-(para-dimethylaminostyryl)indolino[1,2-b]oxazoline

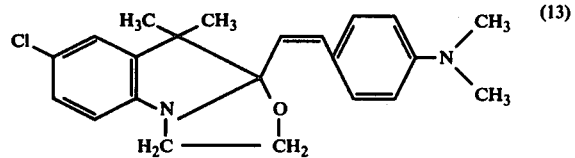

maximum absorption wavelength
at closed ring structure — 299 nm
at open ring structure — 557 nm This compound was prepared in the following way:
In 40 ml of absolute ethanol containing 0.3 ml of triethylamine, 1,2 g of 2,3,3-trimethyl-5-chloroindolino[1,2-b]oxazoline and 0.75 g of para-dimethylaminobenzaldehyde were refluxed by heating for 2 hours, and then the ethanol was eliminated by evaporation. The resultant residue was washed two times with water by decantation, further washed well with cold water, filtered, and then extracted with ethyl ether. The mixture of residue and ethyl ether was treated with active carbon and filtered. The filtrate was evaporated to remove the ethyl ether. The residue was extracted by heating in the suitable amount of n-hexane. The mixture was then filtered. The filtrate was evaporated to remove the n-hexane. Upon vacuum-drying the residue, the desired product, namely pale pinkish white powdered crystals, was obtained. The crystals have a melting point of 165° to 166° C. and exhibit their maximum absorption (in n-hexane) at 299 nm.

EXAMPLE 8

3,3-dimethyl-5-iodo-2-(para-dimethylaminostyryl)indolino[1,2-b]oxazoline

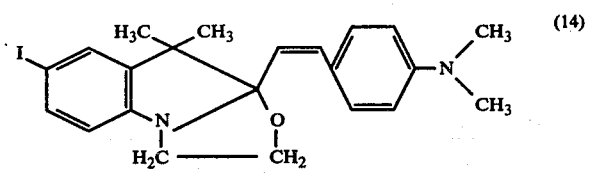
(14)

maximum absorption wavelength
at closed ring structure — 298 nm
at open ring structure — 561 nm

EXAMPLE 9

3,3-dimethyl-4,5-benzo-2-(para-dimethylaminostyryl)indolino[1,2-b]oxazoline

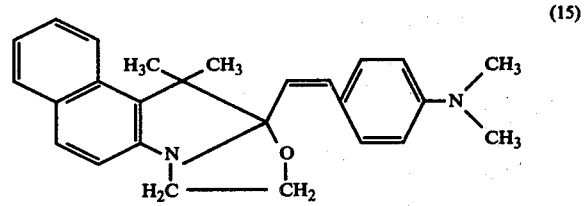
(15)

maximum absorption wavelength
at closed ring structure — 298 nm
at open ring structure — 560 nm This compound was prepared in the following way:
On a water bath, 1.28 g of 2,3,3,-trimethyl-4,5-benzoindolino[1,2-b]oxazoline and 0.75 g of para-dimethylaminobenzaldehyde were subjected to a fusion reaction for 1.5 hours. The reactant was treated with active carbon in 40 ml of acetone. The region of acetone was filtered off and evaporated. The residue was cooled with the suitable amount of water to form a crystal. The crystal was filtered with suction, dried, and then extracted by heating in n-hexane. The mixture was treated with active carbon and, next the solvent was removed by evaporation. The resulting residue was treated with a small quantity of petroleum ether to form a crystal. The formed crystal was of slightly darkish cream or a pale yellow amorphous one. It melts at 197° C. and exhibits its maximum absorption (in n-hexane) at 298 nm.

EXAMPLE 10

3,3-dimethyl-4,5-benzo-2-(para-dimethylaminostyryl)indolino[1,2-b]-1,3-tetrahydroxazine

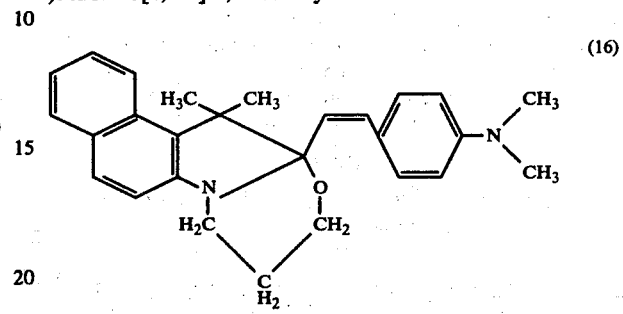
(16)

maximum absorption wavelength
at closed ring structure — 304 nm
at open ring structure — 564 nm

EXAMPLE 11

3,3-dimethyl-2-(para-dimethylaminocinnamylidenevinyl)indolino[1,2-b]oxazoline

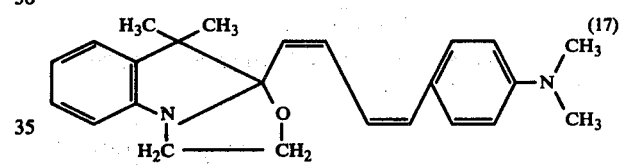
(17)

maximum absorption wavelength
at closed ring structure — 328 nm
at open ring structure — 618 nm

EXAMPLE 12

3,3-dimethyl-5-chloro-2-(para-dimethylaminocinnamylidenevinyl)indolino[1,2-b]oxazoline

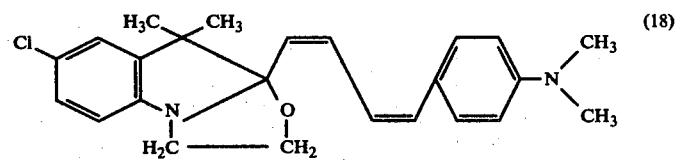
(18)

maximum absorption wavelength
at closed ring structure — 338 nm
at open ring structure — 635 nm

EXAMPLE 13

3,3-dimethyl-5-methoxy-2-(para-dimethylaminocinnamylidenevinyl)indolino[1,2-b]oxazoline

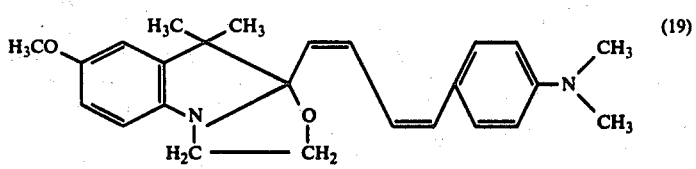

maximum absorption wavelength
at closed ring structure — 326 nm
at open ring structure — 594 nm

EXAMPLE 14

3,3-dimethyl-2-(para-dimethylamino-2-azastyryl)indolino[1,2-b]oxazoline

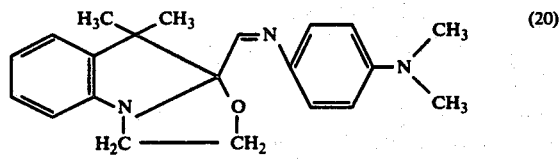

maximum absorption wavelength
at closed ring structure — 290 nm
at open ring structure — 587 nm

EXAMPLE 15

3,3-dimethyl-5-methoxy-2-(paradimethylamino-2-azastyryl)indolino[1,2-b]oxazoline

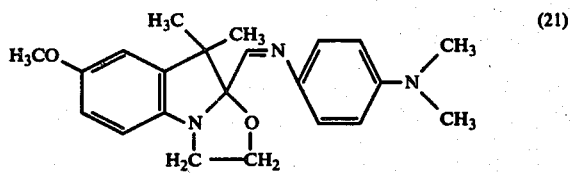

maximum absorption wavelength
at closed ring structure — 271 nm
at open ring structure — 589 nm

EXAMPLE 16

3,3-dimethyl-5-chloro-2-(para-dimethylamino-2-azastyryl)indolino[1,2-b]oxazoline

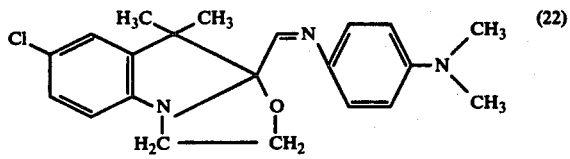

maximum absorption wavelength
at closed ring structure — 301 nm
at open ring structure — 600 nm This compound was prepared in the following way:

In 60 ml of methanol, 1.2 g of 1-hydroxyethyl-3,3-dimethyl-5-chloro-2-(para-dimethylamino-2-azastyryl)indoleniumbromide (max a (in methanal): 601 nm, bright golden or light green scales) was dissolved by heating and treated in ammonia water to separate a creamy crystal. The crystal was filtered out, washed with water and then vacuum dried. The resultant crystal weighed 0.9 g of the desired product, namely a grayish white amorphous crystal, melting at 176° C. Upon treating it with n-hexane, a pale blue-grayish white powder was formed. It melts at 180° C. and exhibits its maximum absorption (in n-hexane) at 303 nm.

EXAMPLE 17

3,3-dimethyl-2-(para-methoxystyryl)indolino[1,2-b]-1,3-tetrahydroxazine

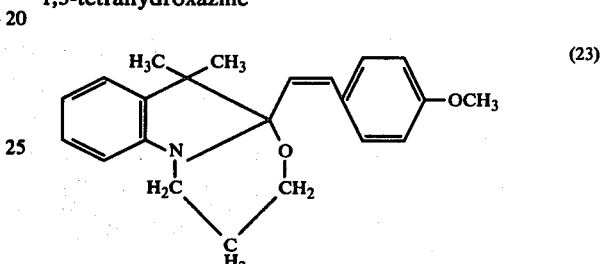

maximum absorption wavelength
at closed ring structure — 264 nm
at open ring structure — 423 nm

EXAMPLE 18

3,3-dimethyl-5-chloro-2-(para-dimethylaminostyryl)indolino[1,2-b]thiazoline

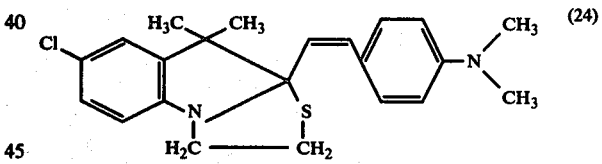

maximum absorption wavelength
at closed ring structure — 408 to 410 nm
at open ring structure — 538 to 540 nm
This compound was prepared in the following way:

One gram of 1-mercaptoethyl-3,3-dimethyl-5-chloro-2-(para-dimethylaminostyryl)indoleniumchloride (mp: 237° to 238° C., max a: 538 to 540 nm, light purple granules) was dissolved with heating in 20 ml of chloroform. The solution was mixed with 1.5 ml of triethylamine and evaporated to remove the solvent. The residue was extracted with heating with n-hexane. The n-hexane-insoluble parts were eliminated from the mixture by filtration. After evaporating the filtrate to take away the solvent, the residue was washed with petroleum ether with the formation of 0.65 g of the desired product, namely orange yellow granules, which melt at 114° to 115° C. and exhibit their maximum absorption (in n-hexane) at 408 to 410 nm.

EXAMPLE 19

3,3-dimethyl-2-{2-(9-methylcarbazolyl)-vinyl}-indolino[1,2-b]oxazoline

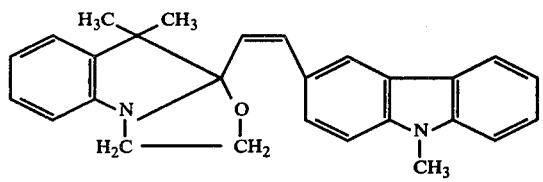

maximum absorption wavelength
at closed ring structure — 284 to 285 nm
at open ring structure — 500 to 502 nm

EXAMPLE 20

3,3-dimethyl-2-(para-dimethylaminostyryl)indolino[1,2-b]oxazoline

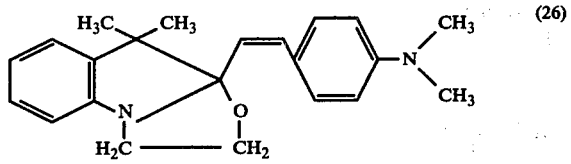

This compound was prepared in the following way:

In 30 ml of absolute ethanol, 1.4 g of 1-hydroxyethyl-2,3,3-trimethyl-indoleniumbromide and 0.7 g of para-dimethylaminobenzaldehyde were refluxed with heating for 3.5 hrs, and then ethanol was eliminated by evaporation. After cooling with ice and washing with ethylether, the resultant residue was filtered off as a crude crystal which was 1-hydroxyethyl-3,3-dimethyl-2-(para-dimethylaminostyryl)-indoleniumbromide. The crude crystal was dissolved into 30 ml of methanol followed by addition of 5 ml of 57% aqueous hydrogen iodide. After heating for about three minutes, the mixture was cooled with ice. The resultant crystal was filtered off and washed well with water, and then washed with an organic solvent such as mixture of ethylether and acetone. The resultant crude crystal was recrystallized with alcohol to obtain 1.5 g of known 1-hydroxyethyl-3,3-dimethyl-2-(para-dimethylaminostyryl)-indoleniumiodide of a bright purplish blue needles in a 78% yield.

Structural formula was:

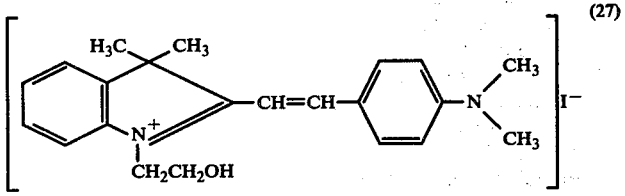

Melting point: 222°–223° C.
Maximum absorption: (in H$_2$O) 550 nm
Maximum absorption: (in Methanol) 547 nm
Maximum absorption: (in Dichloroethane) 564 nm.

In 15 ml of methanol, 0.5 g of 1-hydroxyethyl-3,3-dimethyl-2-(para-dimethylaminostyryl)indoleniumiodide (mp: 222° to 223° C., max a (in water): 550 nm, bright purple or indigo blue needles) was dissolved with heating. The solution was refluxed in 10 ml of 28% ammonia water for 5 to 10 minutes and evaporated to remove the solvent. The residue was mixed with 10 ml of 28% ammonia water, diluted with 100 ml of water, and then cooled with ice. The resultant crystal was taken out by filtration and sufficiently washed with water. The resultant pale yellowish cream-white amorphous crystal with negative halogen reaction was extracted with heating with 30 ml of ethyl ether and filtered to remove any insoluble parts. The filtrate was evaporated to take off the solvent. By the extraction of the residue with heating with 30 ml of n-hexane, 0.3 g of pale yellowish cream amorphous crystal identical with the one of Example 1 was obtained. It melts at 142° C. and exhibits its maximum absorption (in n-hexane) at 296 nm.

(A) Stimulation by Light: Any one of the compounds of the present invention changes color by light-stimulation.

For example, the compound of Example 1 indicated by the chemical formula (3) is dissolved into n-hexane, the solution is applied on a white paper, and then the solvent is evaporated. When exposed to ultraviolet rays, the paper becomes pink. The pink color remains for a considerable length of time even after removing the ultraviolet rays. The reason for the abovementioned retention of the color is presumed that the compound of formula (3) which has been stimulated by the ultraviolet rays to form an open-ring structure is subsequently stimulated by anions and protons of water contained in the paper.

Others of the abovementioned styryl-like compounds also show similar effects. For instance, the compound of Example 7 indicated by formula (9) changes its color from transparent to red at stimulation by ultraviolet rays.

Though ultraviolet rays are suitable for the effective stimulation, other rays, for instance, visible rays can be used if a sufficient time is given for the stimulation. When a glass sheet in place of the paper is employed, the color changes become reversible since neither anion nor proton exists on the glass.

(B) Stimulation by temperature: Any of the compounds of the present invention changes color by heat-stimulation.

For example, the compound of Example 1 indicated by formula (3) is dissolved into dimethyl sulfoxide. The transparent solution is retained in a thin gap between a pair of glass plates. When the solution is heated gradually, the solution turns red at above 140° C., and turns transparent when the temperature falls down.

Such color-changes by heat-stimulation take place at temperatures around the melting point of the compound. The color-changing temperatures are lowered considerably when protons or anions exist surrounding the compounds.

As another example, when the compound of Example 7 indicated by formula (5), alone is heated, the compound changes its color from transparent to red at about 165° C., while the same compound is dissolved in dimethylsulfoxide containing a small amount of methylalcohol. When the resultant solution is heated, color changes to red at about 50° C.

The higher the proton concentration around the compound gets, the lower the color changing temperature becomes.

As another example, when the compound of Example 2, indicated by formula (4), is dissolved in a non-proton solvent and is heated, then the solution changes its color to pink at about 130° C.

As another example, when the compound of Example 17, indicated by formula (19), is dissolved in a non-proton solvent and is heated, the solution turns red at about 90° C.

(C) Stimulation by electricity: The compound of Example 1, indicated by formula (3), is dissolved in dimethylsulfoxide. The resultant solution is then confined in a glass cell shown in the attached FIGURE, wherein 1 designates the abovementioned solution, numeral 2 and 3 designate electricity-conductive films constituting a pair of electrode, either one or both of which are made transparent. Numerals 4 and 5 designate glass plates and 6 designates a spacer of a specified thickness, for instance 0.005 to 0.1 mm. The spacer is made of polyethylene terephthalate or polyfluoroethylene and serves as an insulating side wall encircling brims of the glass plates 4,5. When a D.C. or an A.C. voltage is impressed across the electrodes 2 and 3, the compound contained in the solution in the cell changes its color. The voltage required to change the color is as low as, for instance, 2.0 volts. When the voltage is removed, the color changes back. Especially, when a D.C. voltage is used, and a specified amount of reverse bias is applied to the previously applied D.C. voltage for a short period at the beginning of the reversing, the color change can be made quick.

When the compound of Example 1, indicated by formula (3), is confined in the cell at the voltage impression, the maximum light absorption, of the wavelength of 552 nm takes place displaying a reddish pink color.

When the compound of Example 7, indicated by formula (9), is confined in the cell with the voltage impression, the maximum light absorption wavelength becomes 557 nm showing a reddish pink color.

When the compound of Example 2, indicated by formula (4), is confined in the cell with the voltage impression, the maximum light absorption wavelength becomes 542 nm showing a reddish pink color.

As the abovementioned solvents, those of non-proton nature are suitable. The color changes (and/or reappearance and dissappearance) at voltage impression are presumed to be caused by anions and protons, and therefore, the mechanism of the color change is considered to be similar to that caused by ions.

(D) Stimulation by pressure: The compound of Example 4, indicated by formula (6), is dispersed in gelatin together with, but in a separated state from, acid clay, and the mixture is applied on a sheet of paper and then dried. The paper is white when left alone. When some parts of the paper are pressed, then the dye on the pressed parts reacts with particles of the acid clay, and therefore, becomes red.

(E) Stimulation by radio active rays: The compound of Example 6, indicated by the formula (8) and hydroquinone are dispersed in gelatin each by $10^{-2}$ mol % concentration. When the resultant mixture is exposed to radiant rays, electron beam, α-rays or δ-rays, the mixture becomes blue. The blue color is retained even after elimination of the emission of the rays.

When the compound of Example 18, indicated by formula (20), is dispersed in the gelatin in place of the abovementioned compound, then the mixture becomes red at the exposure to the radiation, and the red color is retained even after elimination of the radiation.

When the compound of Example 19, indicated by formula (21), is used in place of the abovementioned compound, the mixture becomes orange, and the orange color is retained after elimination of the radiation.

When the compound of Example 6, indicated by the formula (8), and hydroquinone are dissolved in a non-proton polar solvent each at $10^{-2}$ mol % concentration, then the mixture becomes blue at the exposure to the radiation, and the color changes back after elimination of the radiation.

What we claim is:

1. An apparatus for changing color comprising a pair of electrodes which are disposed with a specified space therebetween, at least one of said electrodes being transparent, said space together with the electrodes constituting a cell, and a solution in the space of said cell comprising a color changing dye in a non-protonic solvent therefor, the color of said solution changing, disappearing or appearing upon electrical stimulation, said dye being represented by the formula:

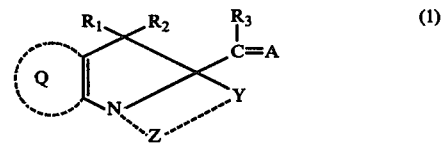

wherein Q representa a benzene ring with or without substituted radicals or Q represents

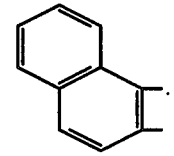

$R_1$ and $R_2$ represent a member selected from the group consisting of lower alkyl radicals, hydroxy-alkyl radicals and alkoxy-alkyl radicals, $R_3$ represents a member selected from the group consisting of hydrogen, alkyl radicals, alkoxy-radicals, halogen, a nitrile radical, aromatic radicals and phenoxy radicals, Y represents a member selected from the group consisting of oxygen and sulfur; Z represents an unsubstituted or alkyl substituted alkylene radical of 2 to 4 carbon atoms which alkylene radical forms a ring structure together with

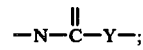

and A represents the radical formed when said dye is produced by a condensation reaction of the methyl radical or methylene radical in the 2-position of a precursor indoline derivative represented by the formula:

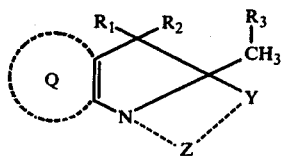

(II)

wherein Q, $R_1$, $R_2$, $R_3$, Y and Z are defined as in formula (I) above with a member selected from the group consisting of aromatic aldehydes, heterocyclic aldehydes, aromatic nitroso compounds and heterocyclic nitroso compounds.

2. An apparatus according to claim 1, wherein the solvent is a non-protonic polar solvent.

3. An apparatus according to claim 1, wherein the solvent comprises dimethyl sulfoxide.

* * * * *